US009038162B2

(12) United States Patent
Hagiu et al.

(10) Patent No.: US 9,038,162 B2
(45) Date of Patent: *May 19, 2015

(54) CREATING SECURE INTERACTIVE CONNECTIONS WITH REMOTE RESOURCES

(75) Inventors: Costin Hagiu, Sammamish, WA (US); Elton Saul, Bellevue, WA (US); Rajneesh Mahajan, Seattle, WA (US); Sergey A. Kuzin, Redmond, WA (US); Joy Chik, Sammamish, WI (US); John E. Parsons, Redmond, WA (US); Ashwin Palekar, Sammamish, WA (US); Ara Bernardi, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/532,593

(22) Filed: Jun. 25, 2012

(65) Prior Publication Data
US 2012/0266214 A1   Oct. 18, 2012

Related U.S. Application Data

(63) Continuation of application No. 11/354,456, filed on Feb. 15, 2006, now Pat. No. 8,220,042.

(60) Provisional application No. 60/716,554, filed on Sep. 12, 2005.

(51) Int. Cl.
*G06F 21/00* (2013.01)
*H04L 29/06* (2006.01)
(Continued)

(52) U.S. Cl.
CPC ............ *H04L 63/0823* (2013.01); *G06F 21/42* (2013.01); *G06F 21/606* (2013.01); *G06F 2221/2107* (2013.01); *H04L 67/141* (2013.01); *H04L 67/14* (2013.01)

(58) Field of Classification Search
USPC ............................................. 726/14; 713/201
See application file for complete search history.

(56) References Cited

U.S. PATENT DOCUMENTS 6,052,785 A * 4/2000 Lin et al. ........................... 726/5
6,189,098 B1 * 2/2001 Kaliski, Jr. .................... 713/168
(Continued)

FOREIGN PATENT DOCUMENTS

CN   1578215   2/2005
EP   1501256   1/2005
(Continued)

OTHER PUBLICATIONS

"From trusted to secure: building and executing applications that enforce system security"; Hicks et al; System and internet infrastructure security lab, Penn State University;2007 USENIX Annual Technical Conference ; 14 pages.*
(Continued)

*Primary Examiner* — Jason Lee
(74) *Attorney, Agent, or Firm* — Danielle Johnston Holmes; Micky Minhas

(57) ABSTRACT

Implementations of the present invention efficiently establish secure connections between a client and server, at least in part by authenticating the client and server early on in the connection setup phases. A client initiating a connection with a server identifies the secure communication protocols enabled at the client, and identifies these protocols in a connection request it sends to the server. The server processes the message and responds with a communication protocol it deems appropriate for the connection. The client and server then exchange appropriate authentication information, and then establish a connection session that implements the chosen communication protocol, and encrypts messages using the negotiated communication protocol. Additional implementations relate to reestablishing dropped connections behind virtual Internet Protocol addresses, without necessarily having to recommit much connection resource overhead.

20 Claims, 5 Drawing Sheets

(51) Int. Cl.
*G06F 21/42* (2013.01)
*G06F 21/60* (2013.01)
*H04L 29/08* (2006.01)

(56) References Cited

U.S. PATENT DOCUMENTS

| | | | |
|---|---|---|---|
| 6,198,824 B1 | 3/2001 | Shambroom | |
| 6,611,503 B1* | 8/2003 | Fitzgerald et al. | 370/260 |
| 6,631,417 B1 | 10/2003 | Balabine | |
| 6,871,284 B2* | 3/2005 | Cooper et al. | 726/1 |
| 8,220,042 B2 | 7/2012 | Hagiu et al. | |
| 2002/0120719 A1 | 8/2002 | Lee et al. | |
| 2002/0194501 A1* | 12/2002 | Wenocur et al. | 713/201 |
| 2003/0079143 A1 | 4/2003 | Mikel | |
| 2003/0172272 A1 | 9/2003 | Ehlers et al. | |
| 2004/0268118 A1* | 12/2004 | Bazan Bejarano | 713/151 |
| 2005/0050329 A1 | 3/2005 | Wilding et al. | |
| 2005/0114712 A1 | 5/2005 | Devine | |
| 2005/0193136 A1* | 9/2005 | Burckart et al. | 709/230 |
| 2006/0013192 A1* | 1/2006 | Le et al. | 370/351 |
| 2006/0090097 A1* | 4/2006 | Ngan et al. | 714/6 |
| 2006/0239206 A1 | 10/2006 | Rao et al. | |
| 2007/0067836 A1* | 3/2007 | Busboom et al. | 726/10 |

FOREIGN PATENT DOCUMENTS

| | | |
|---|---|---|
| JP | 2005025739 | 1/2005 |
| JP | 2002189976 | 7/2005 |
| WO | WO 9938081 | 7/1999 |

OTHER PUBLICATIONS

"An Architecture of Enforcing End-to-End Access Control over Web Applications" Boniface Hicks, et al; Systems and Internet Infrastructure Security Laboratory; Department of Computer Science and Engineering; The Pennsylvania State University; SACMAT '10, Copyright 2010 ACM 978-1-4503-0049-0/10/06, Jun. 9-11, 2010.
U.S. Appl. No. 11/354,456, Mar. 18, 2009, Office Action.
U.S. Appl. No. 11/354,456, Oct. 1, 2009, Office Action.
U.S. Appl. No. 11/354,456, May 12, 2010, Office Action.
U.S. Appl. No. 11/354,456, Oct. 27, 2010, Office Action.
U.S. Appl. No. 11/354,456, Sep. 13, 2011, Office Action.
U.S. Appl. No. 11/354,456, Mar. 12, 2012, Notice of Allowance.
Hicks, Boniface et al., "An Architecture for Enforcing End-to-End Access Control Over Web Applications", Systems and Internet Infrastructure Security Laboratory; Department of Computer Science and Engineering; The Pennsylvania State University; SACMAT' 10, Copyright 2010 ACM 978-1-4503-0049-0/10/06, 10 pgs.
Chinese 1st Office Action in Application 200680033199.1, mailed Nov. 27, 2009, 7 pgs.
Chinese 2nd Office Action in Application 200680033199.1, mailed Dec. 19, 2011, 9 pgs.
Chinese 3rd Office Action in Application 200680033199.1, mailed Jul. 2, 2012, 12 pgs.
Chinese Notice of Allowance in Application 200680033199.1, mailed Nov. 6, 2012, 4 pgs.
Chinese Notice of Preliminary Exam in Application 200680033199.1, mailed Oct. 14, 2008, 2 pgs.
European Office Action in Application 06803347.1, mailed Apr. 19, 2010, 5 pgs.
European Search Report in Application 06803347.1, mailed Dec. 16, 2009, 7 pgs.
Japanese Notice of Allowance in Application 2008-531219, mailed May 23, 2012, 6 pgs.
Japanese Notice of Rejection in Application 2008-531219, mailed Feb. 3, 2012, 6 pgs.
PCT International Search Report in Application PCT/US06/035333, mailed Jan. 16, 2007, 3 pgs.

* cited by examiner

CREATING SECURE INTERACTIVE CONNECTIONS WITH REMOTE RESOURCES

CROSS-REFERENCE TO RELATED APPLICATIONS

This application is a continuation of U.S. patent application Ser. No. 11/354,456, "now U.S. Pat. No. 8,220,042", filed on Feb. 15, 2006 and entitled "CREATING SECURE INTERACTIVE CONNECTIONS WITH REMOTE RESOURCES," which claims the benefit of, and priority to, U.S. Provisional Patent Application No. 60/716,554, filed on Sep. 12, 2005, entitled "Authentication Methods for Connections with Interactive Privileges." The foregoing patent applications are incorporated herein by reference in their entireties.

BACKGROUND OF THE INVENTION

Background and Relevant Art

As computerized systems have increased in popularity, so have the needs to distribute files and processing resources of computer systems in networks both large and small. In general, computer systems and related devices communicate information over a network for a variety of reasons, for example, to exchange personal electronic messages, sell merchandise, provide account information, and so forth. One will appreciate, however, that as computer systems and their related applications have become increasingly more sophisticated, the challenges associated with sharing data and resources (e.g., a "device," "application," or "application component") on a network have also increased.

Some current ways for distributing resources within a network include centralized computing scenarios, which can involve a centralized network server sharing resources with one or more clients that do not have those resources installed locally. One such protocol that has been used for this type of functionality is the Remote Desktop Protocol ("RDP"). With the Remote Desktop Protocol, a centralized network server can share data and resources of interest with other clients on a network. In some cases, the clients may then be able to interact (e.g., sending mouse and keyboard events, etc.) with those resources just as though those resources were installed locally. Ideally, this interaction between the client computer system and network server occurs seamlessly as though the client computer system had processed the data locally with its own installed resources.

When a user initiates a connection to a centralized server, the user's client computer system initiates a series of protocol exchanges that ultimately lead to the user logging into the server computer system. Part of this set of exchanges is the standard connection "handshake" overhead that is inherent in most types of secure network connections. Much of this overhead is part of setting up an initial connection between the client computer system and centralized server before the user ever has a chance to authenticate with personal credentials (e.g., user name and password). For example, in some cases there can be as many as sixteen different exchanges that occur as part of a client login with a centralized server before the user is presented with a login screen. As a result, the centralized server and client computer system typically commit a significant amount of connection processing resources to generate a user connection session, even before the user has actually had a chance to authenticate.

This relative delay in user authentication can result in a number of different difficulties for the client/server interaction. In particular, one of the problems of this type of connection set up is that anyone can initiate a connection to the server, even if only authorized users can become fully authenticated in the end. This initial connection overhead can create a potential liability for the centralized server to certain types of Denial of Service ("DOS") attacks, such as when an unscrupulous agent initiates multiple connection requests with the intent of overloading and compromising the centralized server.

Another potential problem with connection scenarios such as these is that there can be difficulties when the client and server become disconnected. In particular, there is typically little if any preservation of an original connection setup, and the client computer system and server will need to reestablish the connection, which means restarting previously setup overhead sequences again. This can create problems with client computer systems using connections of fluctuating strength, such as wireless connections, and can inhibit the intended seamless experience for the client computer system.

This can also create difficulties in situations where the client computer systems are connecting to a centralized server through a server farm. For example, an organization might configure a group of servers (i.e., a "server farm") to share load balancing concerns, while at the same time being addressable through a single Virtual Internet Protocol address ("VIP"). If the client computer system, however, disconnects from the server farm, the client computer system is only aware of the VIP, rather than a specific network address for the server in the server farm that is handling the connection with the client computer system. Thus, the client computer system cannot automatically reconnect with the centralized server using the previously established communication settings without some difficulty, and will typically need to restart all of the usual connection protocol exchanges to continue the communication.

Accordingly, there are a number of difficulties in current connection initiation protocols that can be addressed, particularly those dealing with centralized computing environments.

BRIEF SUMMARY OF THE INVENTION

Implementations of the present invention solve one or more problems in the art with systems, methods, and computer program products configured to establish credential information in secure client server communication more securely than previously possible. In particular, implementations of the present invention provide for the exchange of authentication information at a point that does not require a server to allocate a significant amount of connection resources. Furthermore, implementations of the present invention can be easily adapted to allow for the consistent reestablishment of secure connections that have been lost, whether in a typical one-to-one client/server connection, or between a client and a server farm of multiple servers behind a virtual IP address.

For example, a method from a network server perspective of creating a secure connection with a client computer system relatively early in a connection process can involve receiving a connection request from a remote client to communicate with one or more remote server resources at a network server. Generally, the connection request indicates a plurality of secure communication protocols with which the remote client is enabled. The method can also involve sending a connection response to the remote client, where the connection response indicates a preferred secure communication protocol of the plurality of secure communication protocols. In addition, the method can involve confirming use of the preferred secure communication protocol and an exchange of authentication certificates with the remote client, as well as communicating data with a remote client resource of the remote client through the preferred secure communication protocol.

A method from a client computer system perspective of creating the secure connection with the network server can involve identifying a plurality of secure communication protocol capabilities at a client computer system. The method can also involve negotiating a preferred one of the plurality of secure communication protocol capabilities with a network server. As such, the client and network server identify a mutually preferred secure communication protocol.

In addition, the method can involve communicating authentication information with a remote server resource of the network server using the preferred secure communication protocol, to thereby confirm respective identities. Generally, the client can send its own authentication information, and the client will receive an authentication certificate from the server. The server certificate can comprise any one of a self-signed certificate, a manually installed certificate, or a certificate received from a remote certificate authority. The method can further involve confirming the identity of the network server with one or more initial data packets, which were communicated using the preferred secure communication protocol.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention extend to systems, methods, and computer program products configured to establish credential information in secure client server communication more securely than previously possible. In particular, implementations of the present invention provide for the exchange of authentication information at a point that does not require a server to allocate a significant amount of connection resources. Furthermore, implementations of the present invention can be easily adapted to allow for the consistent reestablishment of secure connections that have been lost, whether in a typical one-to-one client/server connection, or between a client and a server farm of multiple servers behind a virtual IP address.

Accordingly, and as will be understood more fully from the following specification and claims, at least one advantage of these principles is that a remote client and network server can establish secure network connections without necessarily subjecting the client or the computer to certain types of DOS attacks. For example, the client computer system and network server can exchange security and credential information early on in an interactive logon connection sequence, such as in the initial sets of request and response messages, rather than after creating a connection session. In addition, implementations of the present invention provide for request and response messages to be confirmed at the client and server when subsequently communicating with a negotiated secure communication protocol. Thus, the client and server can avoid allocating significant resources to unqualified requesting entities that do not provide authenticating information early on, or fail one or more of the confirmation phases of the connection creation.

Figure 1A:
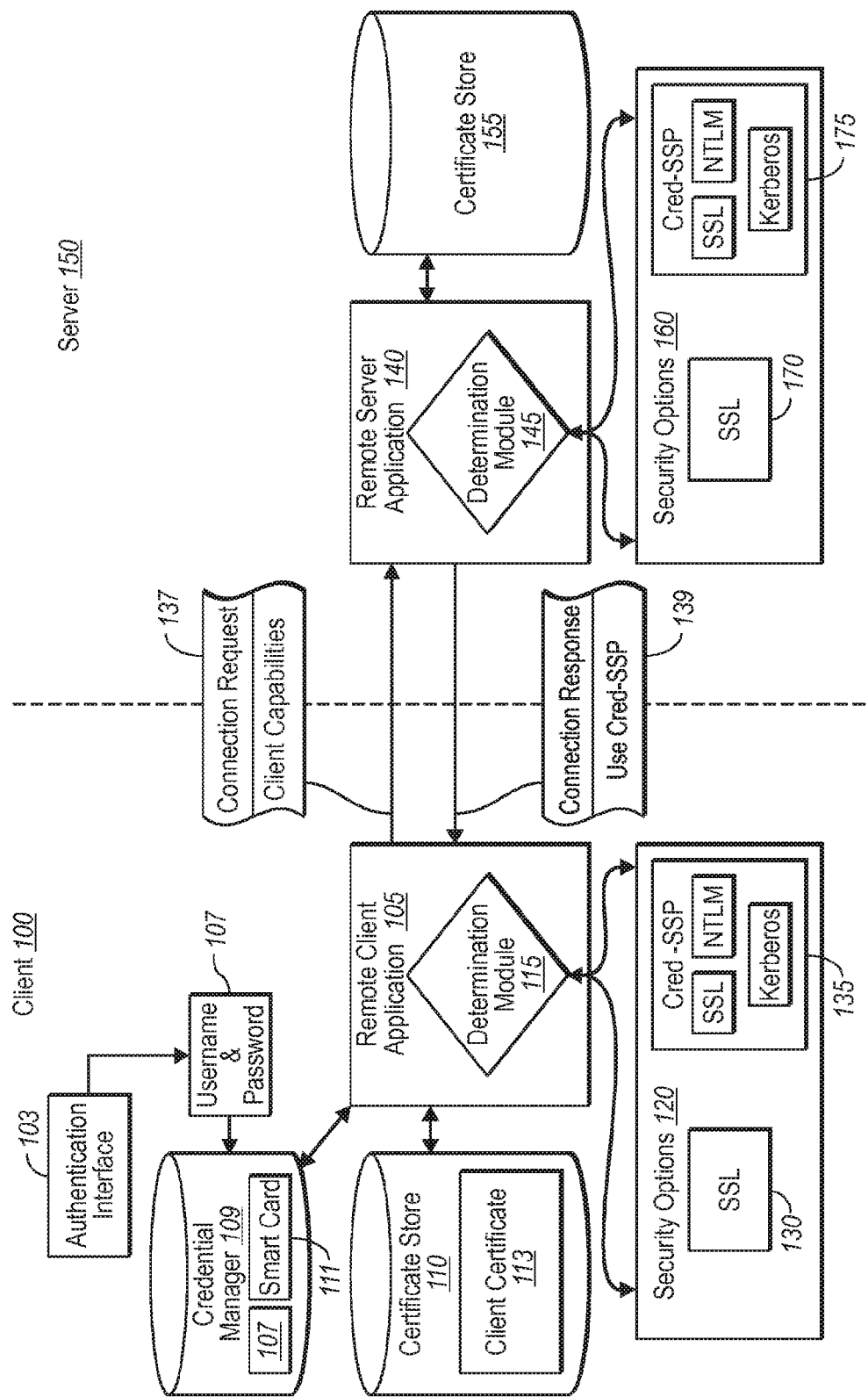
FIG. 1A illustrates an overview schematic diagram of a security negotiation between a client computer system and a network server in accordance with an implementation of the present invention.

For example, FIG. 1A illustrates an overview schematic diagram of a security negotiation between a client computer system and a network server in accordance with an implementation of the present invention. As shown, client 100 includes remote client application 105. Generally, a remote client application (also referred to herein as a "remote resource," or "remote client resource") is an application or related component capable of connecting to another remote application or related component (e.g., remote server application 140) and sharing data. For example, in one implementation, remote client application 105 is a MICROSOFT TERMINAL SERVICES client that uses Remote Desktop Protocol ("RDP") to connect ultimately with a MICROSOFT TERMINAL SERVICES application at a network server after establishing a secure connection session. In such a case, the remote client resource might access the server resource to provide certain application functionality (e.g., word processing, spreadsheet, etc.), which is then displayed at a display screen (not shown) of client computer system 100.

FIG. 1A further shows that remote client application 105 is in communication with security options component 120, as well as credential manager 109 and certificate store 110, which are discussed in more detail hereinafter. In general, security options component 120 is a list (e.g., a system configuration table) of all of the secure communication protocols that are enabled (e.g., installed, active) at client computer system 100. This list of secure communication protocols can include any number of known and available such protocols. Nevertheless, FIG. 1A shows that security options 120 at client 100 comprises, for example, Secure Socket Layer ("SSL") component 130, and a "Cred-SSP" ("Credential-Security Service Provider," also known as "Credential-Security Support Provider") component 135. Cred-SSP component 135 is a relatively new WINDOWS security service provider ("SSP") that ties aspects of other secure communication protocols together, such as SSL, WINDOWS NT LAN MANAGER ("NTLM"), and Kerberos. Although not shown, client 100 could also be configured to use a Legacy RDP security infrastructure.

By way of explanation, although components 125, 130, and 135 are illustrated as secure communication protocols (or infrastructures—e.g., Legacy RDP) that are known to be used in the MICROSOFT operating system environment, one will appreciate that the principles outlined in this description are not limited to the specific type of secure communication protocol, nor a specific operating system environment or application. That is, the principles described herein can be easily applied to other related secure client/server or share applications, and corresponding communication protocols; and can be readily implemented in any other operating system environments. Accordingly, specific recitation to names commonly used in the MICROSOFT operating environment is made primarily for descriptive convenience.

In any event, FIG. 1A also shows that remote client application 105 can receive client credentials (e.g., user name and password 107) through authentication interface 103. For example, upon receiving a request to initiate remote client application 105 from some user input, or upon receiving a generic login request such as at computer startup, client 100 presents the user with authentication interface 103. Authentication interface 103 asks the user to present such things as a user name and password, a smart card, or some other authentication information. This and other client authenticating information supplied by the user can then be stored in, for example, credential manager 109. Other types of client authentication information can include such things as smart card and Personal Identification Numbers ("PINs") 111.

In some cases, client 100 can also have authentication information in the form of a client certificate 113, which is stored in a client certificate store 110. More typically, however, the certificate—as an authentication object—will be used by server 150, as discussed more fully hereinafter. In general, there are many different kinds of security certificates that can be created from some form of input and stored in a certificate store, and ultimately used to identify a user or computer system. In some cases, a certificate can be no more than a placeholder for providing an encryption key. Nevertheless, some types of certificates include "self-signed certificates," which are essentially digital signatures that are signed by the creator, but not necessarily endorsed by a third-party.

Other types of certificates include manually-installed certificates, such as where a user accesses a server and manually installs a preferred certificate the user may have created. Still other types of certificates include ones that a user receives through a third-party certificate server endorsement infrastructure, such as a digital signature that has been endorsed by a recognized authenticating party. In any event, any or all of these types of certificates can be stored at certificate store 110 (or store 155) at any given time. Nevertheless, FIG. 1A, shows that certificate store 110 holds certificate 113; and, as will be detailed more fully hereinafter, certificate store 110 will ultimately hold a server certificate 117 (e.g., FIGS. 1B-1C) sent from server 150.

When a user at remote client application 105 desires to initiate a secure interactive logon connection with server 150, client application 105 can first perform an internal security detection. For example, client application 105 can identify each of the available, enabled secure communication protocols in security options component 120. Client application 105 can then identify that there are at least components 125, 130, and 135, which can each be used in secure network communications. Client application 105 might also detect an existing security infrastructure, such as a Legacy RDP infrastructure it might prefer to use in certain circumstances.

Remote client application 105 then prepares a connection request message 137, which indicates each of the identified different secure communication protocols (i.e., 125, 130, 135, etc.) or related security infrastructures. Notably, connection request message 137 can be a generic connection request that does not request access to a specific resource, such as normally done in an interactive logon. One will appreciate, however, that principles of the invention can also be applied to logon connection requests that are directed to a specific resource at server 150. Nevertheless, connection request 137 can be an "X224" connection request message in at least one implementation, which is extended to include the identified different secure communication protocols (i.e., "client capabilities"). Remote client application 105 then sends connection request 137 over a network, and ultimately to remote server application 140.

In alternative implementations, client 100 does not prepare an X224 connection request message, but, rather, sends message 137 using SSL directly to the server-side Cred-SSP 175. Server 150 then identifies SSL and Cred-SSP indications in the initial one or more packets of message 137. In some cases, this can allow client 100 and server 150 to complete the security negotiation phase more quickly without some of the overhead otherwise associated with creating X224 connection request and response messages.

In any event, and assuming message 137 is sent using X224, or another related method, remote server application 140 receives and processes message 137. Server 150 then identifies the secure communication capabilities proposed by client 100, and determines an appropriate choice of secure communication protocols (or security infrastructures). For example, FIG. 1A shows that server 150, via determination module 145 of application 140, identifies that server 150 is also enabled with any of an SSL component, 170, and/or a Cred-SSP component 175. Although not shown, server 150 may also be enabled with a Legacy RDP security infrastructure. In one implementation, determination module 145 determines to use a particular secure communication protocol by reviewing a server-side security options component (e.g., component 160), which is similar in some respects to client-side component 120. Of course, server 150 may be enabled with fewer or greater numbers of secure communication protocols than are present with client 100. In such a case, determination module 145 can identify those communication protocols that are common with client 100, and pick a preferred communication protocol (or infrastructure).

Determination module 145 can make this determination based on any number of factors, including but not limited to system settings, network administrator or other user preferences, and/or other network conditions. FIG. 1A, however, shows that remote server application 140 decides to communicate using the Cred-SSP secure communication protocol 139. In particular, FIG. 1A shows that remote server application 140 prepares connection response message 139, which includes an indication that server 150 desires to communicate using Cred-SSP (components 135 and 175 at client 100 and server 150, respectively). In one implementation (e.g., message 137 is an X224 connection message), connection response message 139 is also an X224 format connection response message. Sever 150 then sends message 139 to client 100, the receipt of which by client 100 completes the initial security negotiation phase of the requested connection.

If message 139 does not contain an indication of a preferred secure communication protocol, client 100 may identify that server 150 is an older server that is unable to perform the security negotiation phase as previously described. In such a case, client 100 can simply drop the connection, prompt the user for additional action, or adjust to a default security communication protocol that it knows server 150 is likely to understand. As with other determinations, this default setting can be based on any of a user, network administrator, or other system-wide default setting. In one implementation, receiving connection response message 139 without an indication of secure communication protocol preferences causes remote client application 105 to default to an RDP communication protocol.

Figure 1B:
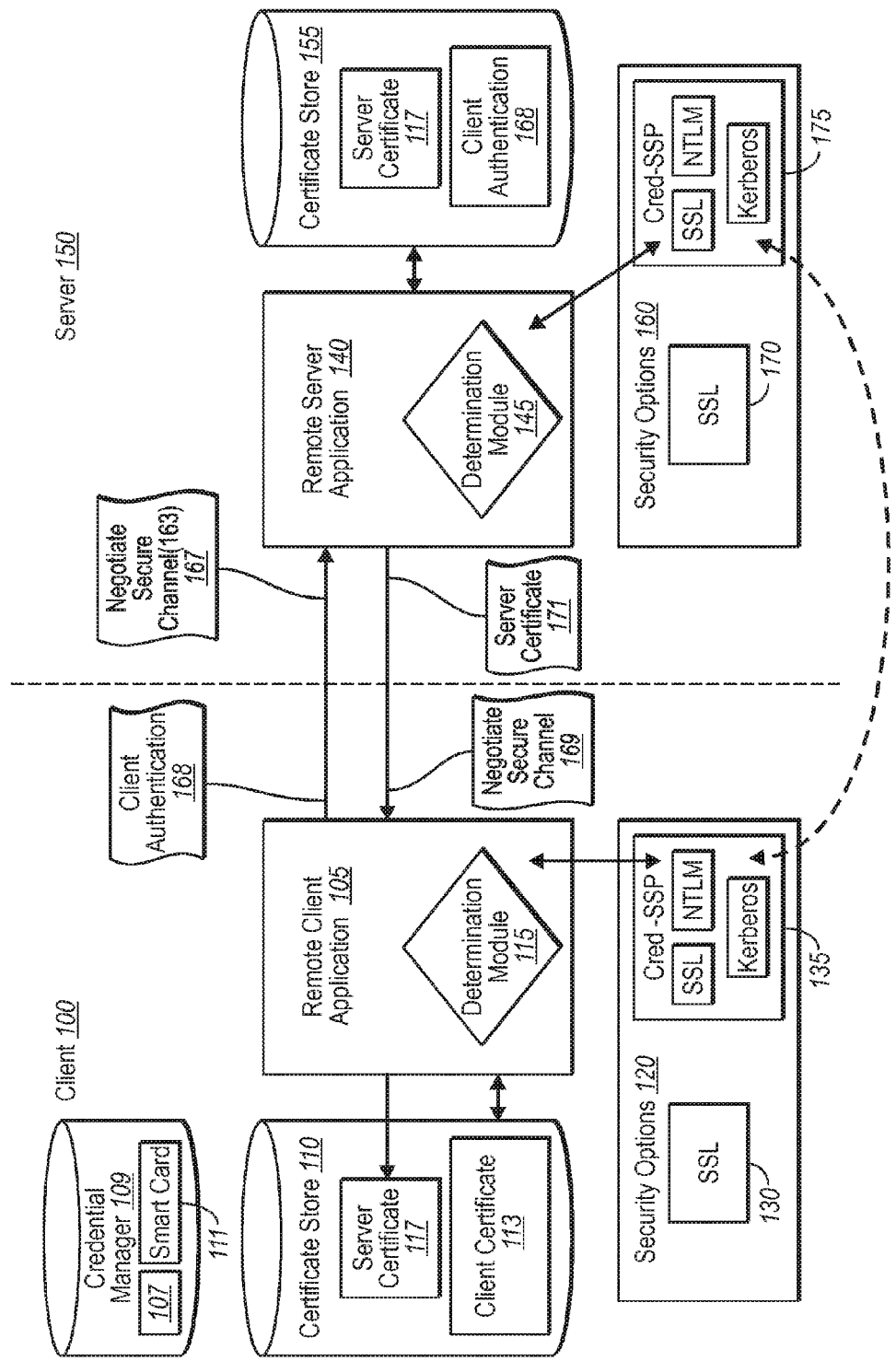
FIG. 1B illustrates the schematic diagram of FIG. 1A in which the client computer system and network server negotiate a secure channel, and exchange authentication information to ultimately establish the secure channel in accordance with an implementation of the present invention.

After completing the previously-described security negotiation phase, FIG. 1B shows that client computer system 100 and server 150 can set up a secure communication channel. In this particular case, client 100 and server 150 initiate a secure communication channel using respective "Cred-SSP" components in the security layers of their respective communication stacks to talk to each other. This means that the Cred-SSP component 135 at client 100 is communicating with the Cred-SSP component 175 at server 150, (e.g., as indicated by the dashed double arrow in FIG. 1B). For example, FIG. 1B shows that remote client application 105 prepares message 167 to be sent to the remote server resource, i.e. remote server application 140. In this case, message 167 includes one or more proposals of secure channels (e.g., channel 163) to use. Server 100 then reviews message 167 and determines which of the proposed channels to use. Server 100 then sends confirmation message 169, which confirms use of one of the channels (e.g., channel 163) proposed by client 100.

Client 100 and server 150 also exchange authentication information to finalize setting up the negotiated, secure channel (e.g., channel 163 in this case). For example, FIG. 1B shows that Client 100 also sends client authentication information 168 (concurrently with message 167, or shortly thereafter) to server 150, and server 150 replies with server authentication information 171. Client authentication information can include a wide variety of authentication mechanisms, such as user name and password 107, smart card and PIN 111, and, in some cases, even client certificate 113.

By contrast, server authentication information 171 can also include a wide variety of authentication mechanism, such as, for example, a specifically chosen server certificate, as well as a Kerberos account credential and/or ticket. At server 150, determination module 145 can determine which of the available server certificates to use. In one implementation, determination module 145 is configured to prefer a server administrator-selected certificate, then check to see if server 150 system settings indicate a preference for a certificate. If neither the server administrator nor server 150 have indicated a certificate preference, determination module 145 can then have server 145 auto-generate a self-signed certificate for message 171. In any event, remote server application 145 prepares message 171, and the selected security component (i.e., Cred-SSP 175) can insert the determined server certificate into message 171. Server 150 then sends message 171 over the negotiated secure channel (e.g., 163) and places a copy of server certificate 117 in client-side certificate store 110.

One will appreciate that there may be events in which the authentication sent by the client or by the server is rejected by the receiving party. There can be any reasons for such a rejection, including a determination of invalidity by the receiving party, expiration of a time stamp on the authentication, incongruity between identification information and information provided in initial connection set up messages 137, 139, or the like. In such situations, the security component (e.g., Cred-SSP 135, 175) used by the corresponding receiving application (e.g., 105, 140, respectively) can be configured to perform a particular action based on the reason for rejection. For example, the determination module 115 or determination module 145 can consult its configuration settings and request a new certificate, drop the connection, prompt a user for additional action, or the like. In some cases, the appropriate action can depend on a default system setting, or on a user preference, which dictates how the application is configured to handle the type of problem.

Figure 1C:
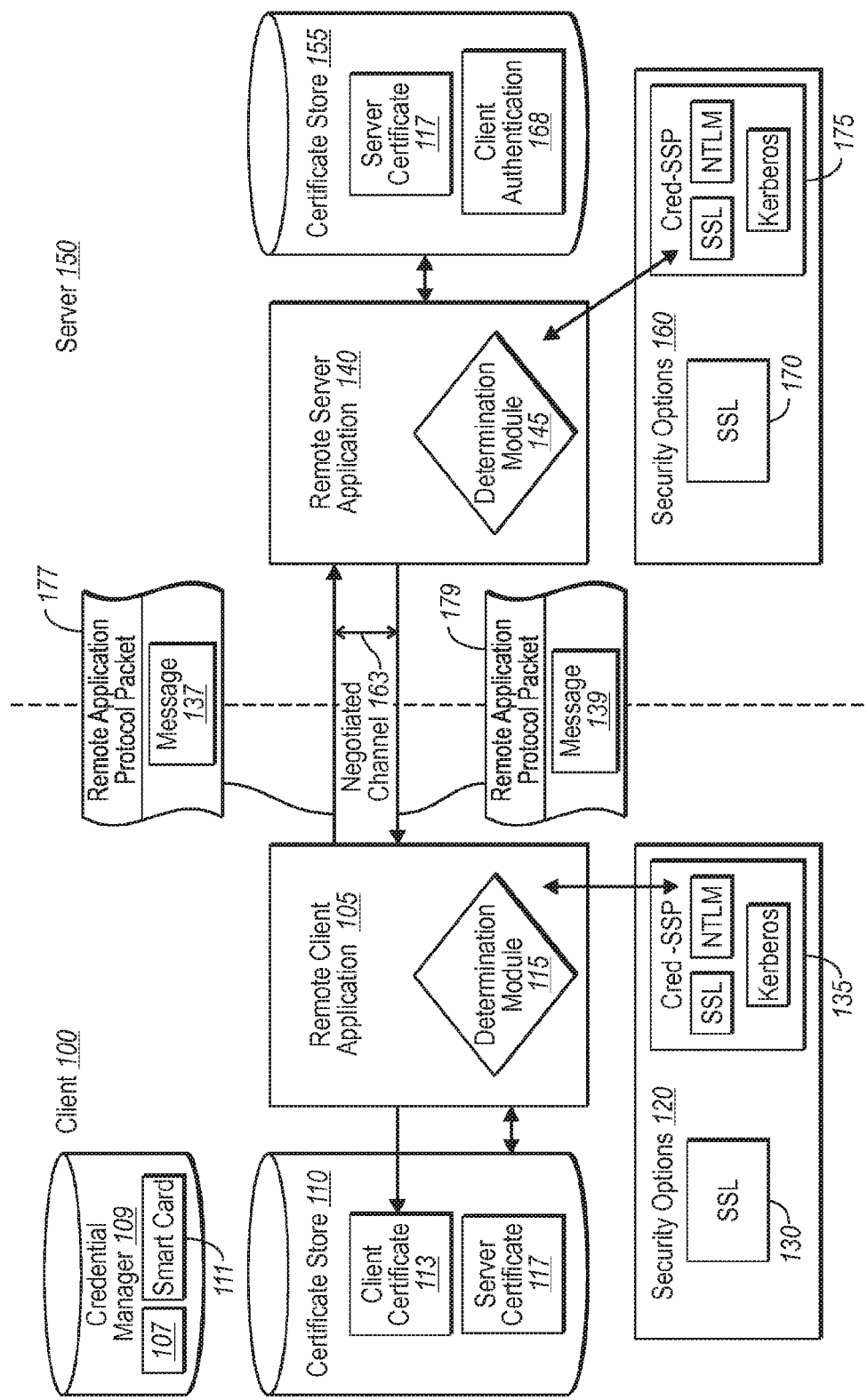
FIG. 1C illustrates the schematic diagrams of FIGS. 1A-1B in which the client computer system and network server exchange data in a manner that confirms their security protocol capabilities and/or choices in accordance with an implementation of the present invention.

In any event, once client 100 and server 150 complete the secure channel setup (i.e., negotiate a secure channel; send, receive, and accept authentication), client 100 and server 150 can establish a user connection session, and begin sending data packets (e.g., FIG. 1C). As a result, FIGS. 1A and 1B show that client 100 and server 150 authenticate each other before establishing the given user connection session. This early authentication can provide a wide range of advantages, at least some of which can be used to mitigate DOS attacks. For example, if the initial set of connection request messages (e.g., 137, 167, 168) received from a client do not include appropriate client authentication information, or an indication of the client's security capabilities, server 150 can be configured to simply drop the connection requests, and thus avoid committing any connection processing overhead.

In addition to these initial connection requests, responses to setup a secure channel, FIG. 1C shows that client 100 and server 150 can send additional messages that increase the security capabilities of the system. For example, client 100 and server 150 can confirm the choice in security protocols, and further authenticate each other when exchanging initial sets of data packets during the user connection session. In particular, FIG. 1C shows that client application 105 prepares message 177, which includes data formatted in accordance with a remote application protocol (e.g., RDP), and which client 100 intends to be processed by remote server application 140. FIG. 1C also shows that message 177 can also include any of messages 137 and/or 139 appended thereto, which confirms that the security protocol selected in the initial authentication is actually what the client and server intended to select, and was not tampered with by another party.

Upon receiving message 177, remote server application 140 can begin processing corresponding data. In some implementations, however, remote server application 140 does not begin processing the data of message 177 until confirming that any appended messages match what server 150 expects. Nevertheless, FIG. 1C shows that, upon processing message 177, remote server application 140 prepares response message 179, which is also formatted as a remote application protocol (e.g., RDP) data packet. In addition, FIG. 1C shows that message 179 can similarly include any of message 137 and/or 139 appended thereto, as a way to confirm the capabilities proposed by server 150 when negotiating the security protocol. Server 150 then sends message 179 to client 100.

Upon receipt, remote client application 105 processes the data contained in message 179. In alternative implementations, however, and as described above, remote client application 105 can first verify that information contained in message 179 (e.g., appended messages, or other) is what client 100 expects before processing the data. If the expected information is missing, client 100 can drop the connection, prompt a user for additional action, and/or send a new connection request. Similarly, if the included information in message 179 differs in some way from what is expected, client 100 can drop the connection, request a correction from the server, or simply start over and make a new connection request (e.g., FIG. 1A).

Assuming client 100 and server 150 have appropriately negotiated and set up a secure communication channel, confirmed the negotiated protocol, and confirmed their respective identities, corresponding applications 105 and 140 can continue communicating using the selected secure communication protocol. For example, application 105 at client 100 can receive, format (e.g., RDP), and send user selection events, such as mouse or keyboard commands, and remote server application 140 can process those events and send corresponding response data to client 100 over secure channel 163. This communication can occur indefinitely, or until either party purposefully or inadvertently closes channel 163. The following table briefly outlines, therefore, an implementation of this initial setup process, such as described in the text above.

| Client 100 | Server 150 |
|---|---|
| Identify supported protocols (e.g., via 115, FIG. 1A) Send X224 Connection Request with list of available protocols (e.g., 137) | |
| | Identify which of the client advertised protocols are available (e.g., via 145, FIG. 1A) Send X224 Connection Response with preferred security protocol (e.g., 139, FIG. 1A) |
| Initiate secure channel setup (e.g., 167, FIG. 1B) | |
| | Accept secure channel setup (e.g., 169, FIG. 1B) |
| Exchange data required for secure channel setup (e.g., 168) | Exchange data required for secure channel setup (e.g., 171, FIG. 1B) |
| Secure Channel setup completed (FIG. 1B) | Secure Channel setup completed (FIG. 1B) |
| Confirm list of available secure protocols (e.g., 177, FIG. 1C) | |
| | Confirm preferred secure protocol (e.g., 179, FIG. 1C) |
| RDP Data Exchange (FIG. 1C) | RDP Data Exchange (FIG. 1C) |

In one implementation of the present invention, client 100 can also restart the user connection session without having to again prompt the user for credentials, or other authentication information. In particular, for client 100 to restart the connection after a drop (such as via an automatic or manual reconnection), client 100 can simply submit a reconnection request that restates its previously valid connection context (i.e., a user credential context, or handle). Generally, a connection context (e.g., 111, FIG. 1D) includes such client connection setting information as the client authentication information (e.g., 168) previously relayed to server 150, as well as the choice in secure communication protocols, and any other appropriate settings that would allow the client and server to readily identify each other. As described above, this typically includes user name and password, and/or smartcard and PIN authentication components. Thus, when a connection drops, and the connection context is still valid (i.e., not expired or changed), client 100 can resubmit its connection context to server 150 without prompting the user for authentication information, and continue communicating through negotiated channel 163 at the point where client 100 and server 150 dropped the connection.

Figure 1D:
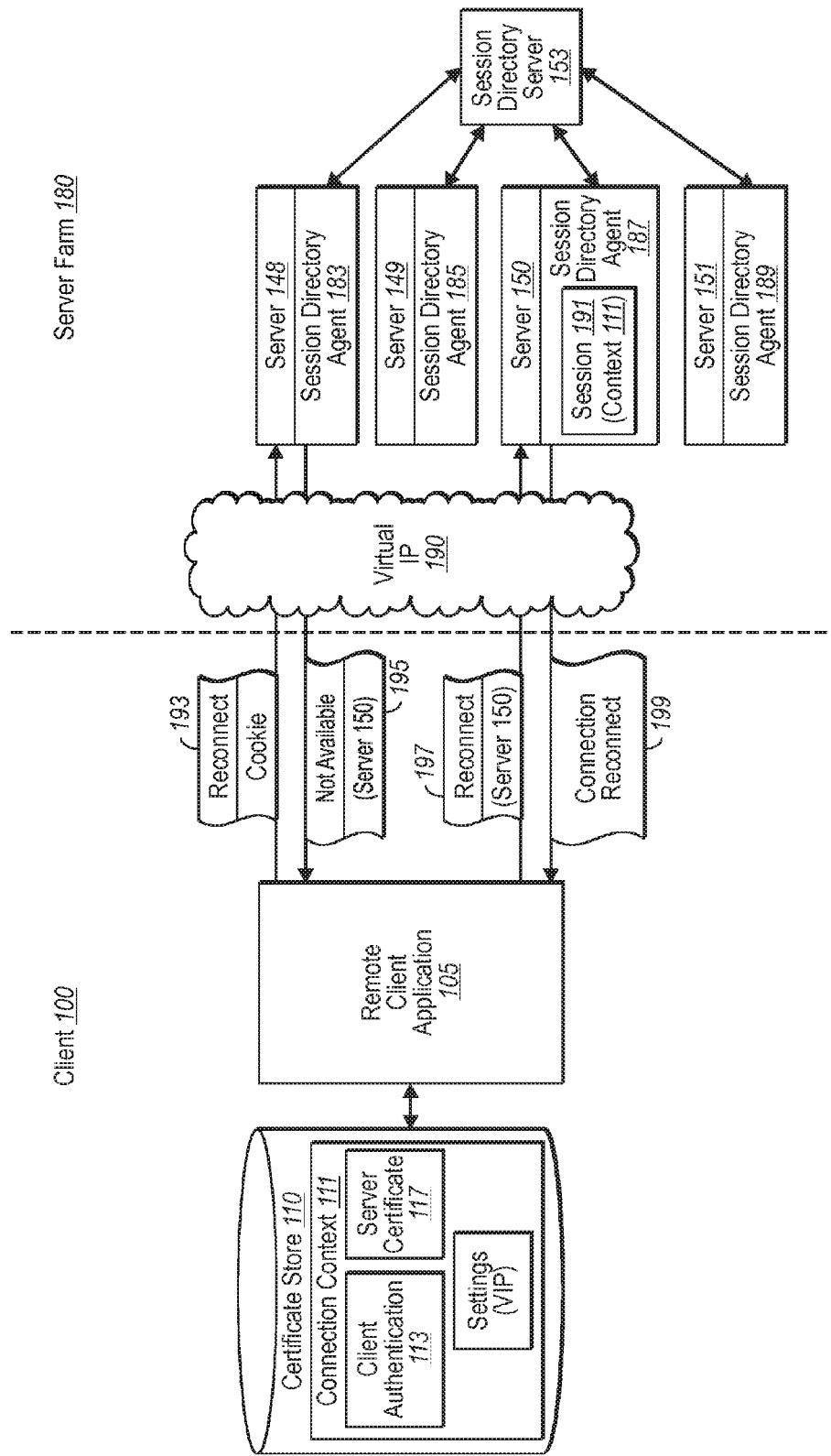
FIG. 1D illustrates another schematic diagram in accordance with an implementation of the present invention where the network server shown in FIGS. 1A-1C is part of a server farm, and where the client computer system and the network server attempt to reconnect after a dropped connection.

Reconnections such as just described can be more complicated, however, with a server farm, such as a group of servers configured for load balancing purposes behind a single IP address. For example, as shown in FIG. 1D, server farm 180 of servers 148, 149, 150, and 151, are each addressable to remote client computers via the same IP address, i.e., virtual IP address 190 ("VIP 190"). Generally, a VIP is served by another edge server, or even by configuration of each server in server farm 180. Alternatively, each server in server farm 180 is configured to handle different aspects of the same VIP, and further relay and route packets to other servers in the server farm. Nevertheless, while all of the servers can share a part of the connection load through a VIP, only any one server at a given time will be able handle a specific session with another computer (e.g., client 100).

To ensure knowledge of connection responsibilities is handled appropriately, FIG. 1D shows that each server 148, 149, 150, and 151 has a corresponding "session directory agent" 183, 185, 187, and 189, which keeps track of connection sessions at the respective server on which the corresponding session directory agent is installed. For example, a server handling a given connection will also have one or more connection sessions based on a given connection context for the connecting client, such as described above for client 100, which includes user authentication information. The server, via a corresponding session directory agent, and central session directory agent server 153, will also have a directory listing of the location of all sessions serviced by other servers in the server farm, e.g. server farm 180 behind VIP 190. That is, no one server will usually have all of the user sessions for all connections serviced through the server farm, but will be able to successfully refer a connection for which it does not have the appropriate information (i.e. sessions corresponding to a given client context) to a server in the farm that does have the information.

Thus, for example, FIG. 1D shows that client 100 prepares reconnection message 193, such as at some point after client 100 or server 150 inadvertently disconnect, and sends this message through VIP 190. FIG. 1D also shows that message 193 includes prior connection information, such as a cookie that includes server 150's name and/or network address, and/or some user information. Generally, the VIP management infrastructure (e.g., via server 153) can recognize the included prior connection information, and thus route message 193 properly to server 150. Server 150 can then establish a secure channel with client 100, confirm via session directory agent 187 (or session directory server 153) that it is servicing a connection context 111 for the prior connection, and then reestablish the prior connection session.

In cases where auto-reconnect does not occur, the process may be a little different since the reconnection message 193 may not include sufficient server identification information. Thus, for example, reconnection message 193 may initially arrive at server 148, which in this case is not servicing the prior connection. Nevertheless, upon setting up a secure channel, server 148 can process enough of message 193 through session directory agent 183, or by reference to session directory server 153, to determine that server 148 does not have the appropriate information to connect using session 191. That is, server 148 does not recognize the user or server identification in message 193, or identifies that it does not have a connection context for the prior connection.

In so processing, session directory agent 183 communicates with session directory server 153, and indicates to server 148 that server 150 has a record for this user session (i.e., via context 111). Thus, server 148 prepares response message 195, which indicates that the connection is not available, and further indicates that the connection can be handled by server 150. Client 100 then receives and processes message 195, and further prepares a new reconnection message 197. Again, client 100 appends the prior connection information, this time clarifying use of server 150 (e.g., server name, and/or network address, etc.).

As shown in FIG. 1D, therefore, reconnection request message 197 is appropriately routed through VIP 190 to server 150. For example, the edge server that interfaces with the Internet and server farm 180 identifies the modified request for server 150, and forwards connection request message 197 to server 150. When server 150 receives connection request 197, server 150 begins processing the message to see if session directory agent 187 has a record for connection context 111. Since session directory agent 187 has a record for context 111, server 150 responds with an appropriate reconnection message (i.e., message 199). This brief sequence of exchanges reestablishes previously negotiated communication channel 163 between client 100 and server 150, and allows the client and server to continue communicating as before, without having to reallocate resources to initiating a new connection session.

Accordingly, FIGS. 1A through 1D provide a number of schematics and components for authenticating a connection sequence relatively early on when creating a secure connection. In particular, FIGS. 1A through 1D illustrate how a secure connection can be established within the first few data packets of a secure connection request, and in such a way as to provide a number of layers of confirmation between the client and server. As such, both the client and server can avoid committing valuable resources to falsified connections, which might otherwise result in a successful DOS attack.

Figure 2:
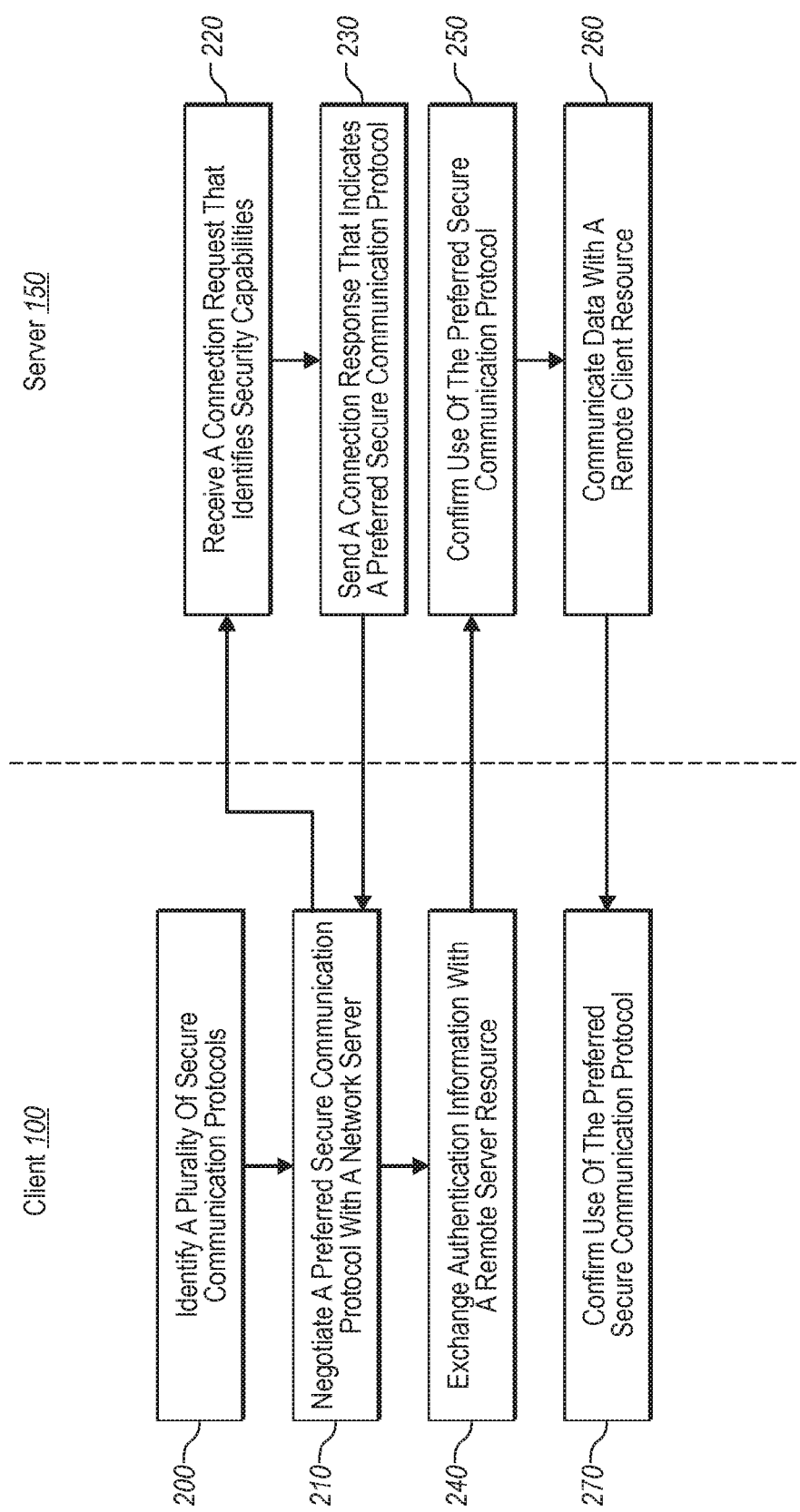
FIG. 2 illustrates flowcharts from the perspective of a client computer system and network server for initiating a secure network connection in accordance with an implementation of the present invention.

Implementations of the present invention can also be described in terms of a sequence of acts (and/or functional steps comprising one or more non-functional acts) in a method for accomplishing a desired result. For example, FIG. 2 illustrates flow charts of acts in methods from the perspective of client 100 and of server 150, respectively, for initiating a secure connection. The acts shown in FIG. 2 are described below with reference to the schematics illustrated in FIGS. 1A-1D.

For example, FIG. 2 shows that a method from the perspective of client 100 comprises an act 200 of identifying a plurality of secure communication protocols. Act 200 includes identifying a plurality of secure communication protocol capabilities at a client computer system. For example, as shown in FIG. 1A, remote client application 105, via determination module 115, identifies that components 125, 130, and 135 are valid, secure communication protocols enabled at client 100.

In addition, FIG. 2 shows that the method from the perspective of client 100 comprises an act 210 of negotiating a preferred secure communication protocol with a network server. Act 210 includes negotiating a preferred one of the plurality of secure communication protocol capabilities with a network server, such that a mutually preferred secure communication protocol is identified. For example, client application 105 performs the acts of preparing and sending message 137 to server 150, where message 137 includes a request for a secure connection, and further indicates that protocols 125, 130, and 135 are available for the connection.

As such, FIG. 2 shows that the method from the perspective of server 150 comprises an act 220 of receiving a connection request that identifies security capabilities. Act 220 includes receiving a connection request from a remote client to communicate with one or more remote server resources at a network server, the connection request indicating a plurality of secure communication protocols with which the remote client is enabled. For example, as shown in FIG. 1A, server application 140 receives message 137 and, upon processing, identifies that client 100 is capable of any of "SSL," and/or "Cred-SSP" communication mechanisms.

In addition, FIG. 2 shows that the method from the perspective of server 150 comprises an act 230 of sending a connection response that indicates a preferred secure communication protocol. Act 230 includes sending a connection response to the remote client, the connection response indicating a preferred secure communication protocol of the plurality of secure communication protocols. For example, as shown in FIG. 1A, server application 140 determines that it has the same enabled security options as indicated from client 100. Server application 140 thus determines a preferred secure communication protocol, in this case "Cred-SSP" 175 from the group based on any number of preferences or system settings. Server application 140 then prepares and sends connection response message 139 to client 100, where message 139 indicates a preference to use Cred-SSP. In one implementation, this completes an initial phase of the security negotiation instituted by the client in act 210.

Accordingly, FIG. 2 shows that the method from the perspective of client 100 comprises an act 240 of exchanging authentication certificates with a remote server resource. Act 240 includes exchanging authentication information with a remote server resource of the network server using the preferred secure communication protocol, where the server authentication information comprises any one of a self-signed certificate, a manually installed certificate, or a certificate received from a remote certificate authority. For example, as shown in FIG. 1B, remote client application 105 identifies one or more appropriate client authentication information components (e.g., user name and password 107, smart card and PIN 111, or client certificate 113 in certificate store 110) and sends the chosen authentication information to remote server application 140 via message 137. In response remote client application receives server certificate 117 from server 150 via message 171.

FIG. 2 further shows that the method from the perspective of server 150 comprises an act 250 of confirming use of the preferred secure communication protocol. Act 250 includes confirming use of the preferred secure communication protocol through an exchange of initial data packets with the remote client computer system. For example, FIG. 1C shows that when server application 140 sends message 179, server 150 also appends a confirmation message to client 100, such as by including a copy of previously sent messages 137 and 139, or be reiterating settings declared previously in message 139.

In addition, FIG. 2 shows that the method from the perspective of server 150 comprises an act 260 of communicating data with a remote client resource. Act 260 includes communicating data with a remote client resource of the remote client through the preferred secure communication protocol. For example, as shown in FIG. 1C, server application 140 receives message 177 (e.g., an RDP data packet) over negotiated communication channel 163, and sends message 179 (e.g., an RDP data packet in response to message 177), or any other data communication to remote client application 105.

As such, FIG. 2 also shows that the method from the perspective of client 100 comprises an act 270 of confirming the use of the preferred secure communication protocol. Act 270 includes confirming the identity of the network server with one or more initial data packets. For example, remote client application receives message 179 over a remote application protocol (e.g., a message prepared using RDP), where message 179 includes certain expected information from server 150, such as a copy of previously sent message 137 and/or 139. Message 179 therefore confirms use of the selected, agreed-to secure communication protocol with client 100.

Accordingly, the schematic diagrams and methods described herein provide a number of components and mechanisms for creating secure communication channels and connection sessions, and for authenticating those secure communication channels and sessions early on in a connection process. In particular, implementations of the present invention can provide greater levels of security in interactive logon and remote resource communication than previously available. For example, a client and server can authenticate each other early on in a connection process, and thus avoid allocating connection sessions to those that do not provide such authentication information at the expected point. In addition, the client and server can append previously sent messages and/or settings at any number of points in a connection sequence to provide extra assurances of the client's and/or server's respective identity.

The embodiments of the present invention may comprise a special purpose or general-purpose computer including various computer hardware, as discussed in greater detail below. In particular, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A server computer system comprising:
at least one hardware processor; and
a storage medium storing computer executable instructions which, when executed by the at least one hardware processor, implement a method of creating a secure connection with a client computer system early in a connection process by negotiating secure connection protocols, including the following:
  prior to the server indicating to the client computer system one or more secure communication protocols enabled at the server, the server receiving a connection request from a client computer system to communicate with one or more server resources using a secure connection, the connection request including the identity of a plurality of secure communication protocols which are installed at the client computer system, and with which the client computer system is presently enabled for establishing the secure connection;
  based on receiving the connection request from the client computer system, the server processing the connection request to select a preferred secure communication protocol to use when establishing the secure connection, including:
    the server identifying the one or more secure communication protocols with which the server is presently enabled for establishing secure connections;
    the server comparing the plurality of secure communication protocols enabled at the client computer system with the one or more secure communication protocols enabled at the server to determine one or more common secure communication protocols that are common to both the one or more secure communication protocols enabled at the server and the plurality of secure communication protocols enabled at the client computer system; and
    the server selecting the preferred secure communication protocol from among the determined one or more common secure communication protocols;
  the server sending a connection response to the client computer system, the connection response indicating the determined preferred secure communication protocol;
  the server establishing a secure communication channel with the client computer system using the preferred secure communication protocol;
  the server confirming use of the preferred secure communication protocol through a data exchange in the secure communication channel established with the client computer system; and
  the server communicating data with a client application program of the client computer system through the secure communication channel using the preferred secure communication protocol.

2. The server computer system recited in claim 1, wherein the plurality of secure communication protocols include at least one of RDP, SSL, NTLM, or Kerberos, or a combination thereof.

3. The server computer system as recited in claim 1, wherein the connection request from the client computer system is an X224 connection request extended to include the plurality of secure communication protocols with which the client computer system is enabled, and wherein the connection response is an X224 connection response extended to include the preferred secure communication protocol.

4. The server computer system as recited in claim 1, wherein selecting the preferred secure communication protocol comprises determining that the preferred secure communication protocol is allowed based on a server system setting.

5. The server computer system as recited in claim 1, further including:
   the server identifying a plurality of server certificates in a certificate store; and
   the server determining a preferred one of the plurality of server certificates to send to the client computer system.

6. The server computer system as recited in claim 5, wherein the preferred server certificate is any of a certificate explicitly selected by a user, a certificate configured through a server system policy, or a self-signed server certificate.

7. The server computer system as recited in claim 1, further including:
   the server receiving client computer system authentication information; and
   the server storing the authentication information as part of a connection context for the client computer system.

8. The server computer system as recited in claim 7, further including a step for determining that the client computer system authentication information is invalid, the step comprising one or more of:
   the server identifying that a timestamp in the client computer system authentication information has expired;
   the server identifying that one or more messages have been received from the client computer system that have not included expected authentication information; or
   the server identifying that a received authentication certificate does not match an expected authentication certificate associated with the connection request from the client computer system.

9. The server computer system as recited in claim 1, further including the server receiving a different connection request directed to a Virtual Internet Protocol (VIP) address, wherein the different connection request includes connection information for a prior connection.

10. The server computer system as recited in claim 9, further including:
    the server identifying that a connection context identified for the prior connection is saved at the server; and
    the server allowing the requested different connection.

11. The server computer system as recited in claim 10, further including:
    the server identifying that a connection context for the prior connection is saved at a different server; and
    the server sending a response message to the client computer system, of the response message indicating that the different server is an appropriate server for the different connection request.

12. The server computer system as recited in claim 1, wherein confirming use of the preferred secure communication protocol through a data exchange in the secure communication channel comprises:
    the server appending one or more messages previously received from the client computer system regarding the initial connection request to an outgoing message prepared by the server, such that the server confirms its selection of the preferred secure communication protocol to the client computer system.

13. The server computer system as recited in claim 1, wherein establishing the secure communication channel with the client computer system comprises exchanging authentication information with the client computer system with the server sending server authentication information to the client computer system.

14. The server computer system as recited in claim 1, wherein the secure communication channel is established in response to a secure channel negotiation message received from the client computer system subsequent to the server the server sending the connection response to the client computer system, the secure channel negotiation message including a proposal of one or more secure channels to use when establishing the secure communication channel, and further including:
    the server sending a confirmation message to the client computer system which confirms use of at least one of the one or more secure channels.

15. A client computer system comprising:
    at least one hardware processor; and
    a storage medium storing computer executable instructions which, when executed by the at least one hardware processor, implement a method of creating a secure connection with a server by negotiating secure communication protocols, including the following:
        prior to the client computer system receiving an indication of one or more secure communication protocols enabled at the server, the client computer system identifying a plurality of secure communication protocols, each of the plurality of secure communication protocols being presently installed and enabled at the client computer system and usable by the client computer system to establish a secure connection with the server;
        the client computer system sending to the server a connection request including the identity of the plurality of secure communication protocols with which the client computer system is presently enabled for establishing the secure connection;
        subsequent to the client computer system sending the connection request, the client computer system receiving a connection response from the server, the connection response specifying a preferred secure communication protocol from among the plurality of secure communication protocols, the preferred secure communication protocol being identified by the server based on the server:
            identifying the one or more secure communication protocols with which the server is presently enabled for establishing secure connections;
            comparing the plurality of secure communication protocols enabled at the client computer system with the one or more secure communication protocols enabled at the server to determine one or more common secure communication protocols that are common to both the one or more secure communication protocols enabled at the server and the plurality of secure communication protocols enabled at the client computer system; and selecting the preferred secure communication protocol from among the determined one or more common secure communication protocols;

the client computer system establishing a secure communication channel with the server by at least exchanging authentication information with the server using the preferred secure communication protocol, wherein authentication information from the server comprises any one of a self-signed certificate, a manually installed certificate, or a certificate received from a remote certificate authority; and the client computer system confirming the use of the secure communication protocol negotiated with the server with one or more initial data packets communicated during negotiation with the server.

16. The client computer system as recited in claim 15, wherein confirming the use of the secure communication protocol negotiated with the server comprises:

the client computer system receiving one or more initial data packets from the server; and the client computer system identifying information having been previously exchanged with the server appended to any of the one or more initial data packets.

17. The client computer system as recited in claim 15, further including the client computer system storing the server certificate received from the server in a connection context at the client computer system.

18. The client computer system as recited in claim 17, further including:

the client computer system identifying that a connection with the server has failed; and the client computer system sending a reconnection request message to a virtual internet protocol (IP) address for the server, wherein the reconnection request message includes at least some information stored in the connection context.

19. The client computer system as recited in claim 18, further including:

the client computer system receiving a response message, including at least one of a new server name and network address for the new server;

the client computer system sending a new reconnection request message to the virtual IP address for the server, the new reconnection request message including the at least one of the new server name and network address for the new server; and the client computer system reestablishing the connection with the new server in accordance with the connection context.

20. One or more computer storage devices having computer-executable instructions encoded thereon that, when executed at a client computer system in a computerized system in which a server communicates data with a client computer system through a secure connection, cause one or more hardware processors at the client computer system to perform a method of creating the secure connection by negotiating secure communication protocols with the server early in a connection process, the method comprising:

prior to the client computer system receiving an indication of one or more secure communication protocols enabled at the server, the client computer system identifying a plurality of secure communication protocols, each of the plurality of secure communication protocols being presently installed and enabled at the client computer system and usable by the client computer system to establish a secure connection with the server;

the client computer system sending to the server a connection request including the identity of the plurality of secure communication protocols with which the client computer system is presently enabled for establishing the secure connection;

subsequent to the client computer system sending the connection request, the client computer system receiving a connection response from the server, the connection response specifying a preferred secure communication protocol from among the plurality of secure communication protocols, the preferred secure communication protocol being identified by the server based on the server:

identifying the one or more secure communication protocols with which the server is presently enabled for establishing secure connections;

comparing the plurality of secure communication protocols enabled at the client computer system with the one or more secure communication protocols enabled at the server to determine one or more common secure communication protocols that are common to both the one or more secure communication protocols enabled at the server and the plurality of secure communication protocols enabled at the client computer system; and selecting the preferred secure communication protocol from among the determined one or more common secure communication protocols;

the client computer system establishing a secure communication channel with the server by at least exchanging authentication information with the server using the preferred secure communication protocol, wherein authentication information from the server comprises any one of a self-signed certificate, a manually installed certificate, or a certificate received from a remote certificate authority; and the client computer system confirming the use of the secure communication protocol negotiated with the server with one or more initial data packets communicated during negotiation with the server.

* * * * *